C. B. ROBERTS.
FURNACE GRATE.
APPLICATION FILED APR. 6, 1914.
1,138,977.
Patented May 11, 1915.
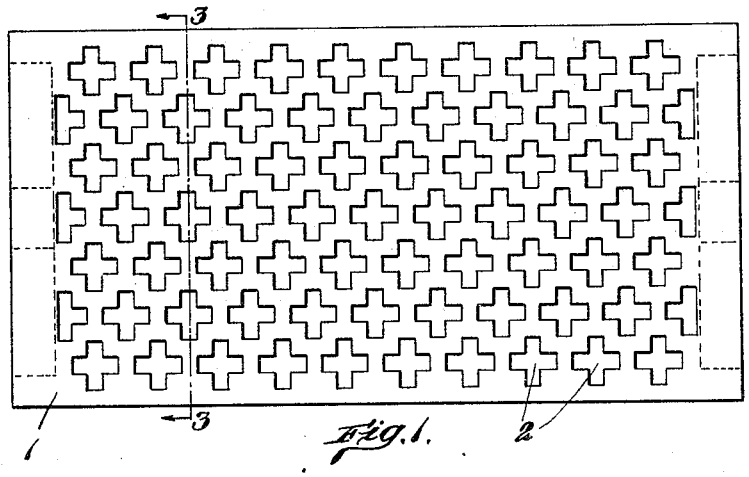
Fig. 1.
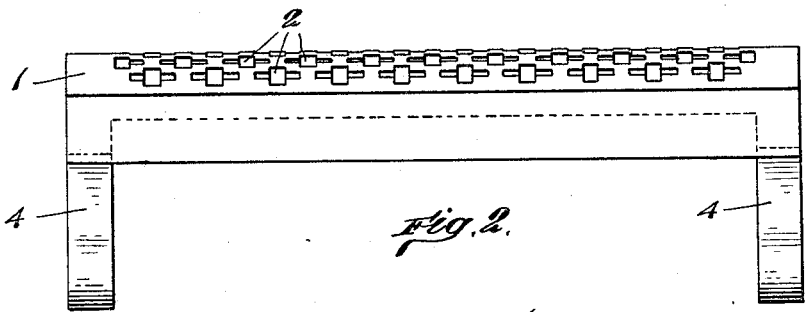
Fig. 2.
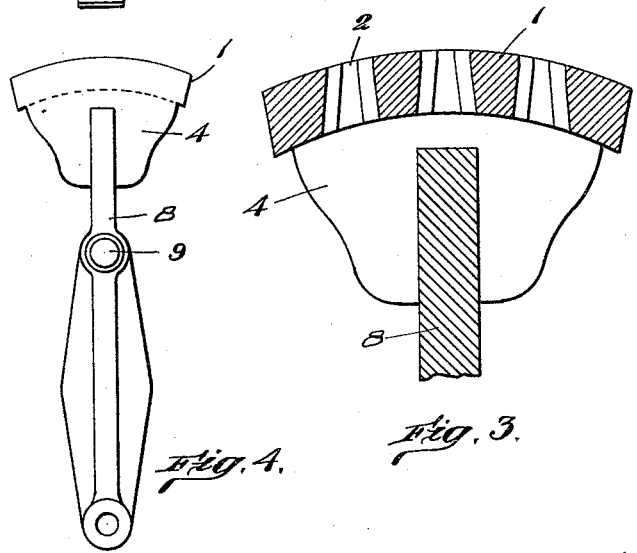
Fig. 4.
Fig. 3.
Witnesses:
Inventor:
Claude B. Roberts

UNITED STATES PATENT OFFICE.

CLAUDE B. ROBERTS, OF BELFAST, MAINE.

FURNACE-GRATE.

1,138,977.  Specification of Letters Patent.  Patented May 11, 1915.

Application filed April 6, 1914. Serial No. 829,917.

*To all whom it may concern:*

Be it known that I, CLAUDE B. ROBERTS, a citizen of the United States, residing at Belfast, in the county of Waldo and State of Maine, have invented an Improvement in Furnace-Grates, of which the following is a specification.

This invention relates to improvements in furnace-grates constructed with a view to obtaining a very high efficiency and rating for a long period of time, as contrasted with a short period of time which has heretofore been obtained, and is intended as an improvement upon the furnace-grate shown and described in my application Serial No. 829,916 filed April 6, 1914, the present grate being especially designed for burning #3 or coarser hard coal with a natural or forced draft.

The essential object of the invention is the construction of the grate-sections to provide for maximum air admission and distribution as compared with their areas, the openings through the grade-sections being small enough to admit of the burning of #3 or coarser hard coal with a natural draft.

The preferred form of grate-section involving this invention is arranged for detachable connection with an oscillating bar-carrier, and is transversely curved from edge to edge throughout its length on an arc of a circle which is preferably of a greater radius than the distance between the top of the section and the fulcrum of the bar-carrier, thus to admit of oscillation of the grate-section and of a slight lifting motion while being oscillated.

The essential feature of the invention, however, is the formation of the openings through the grate-sections and their relative arrangement. These openings are of the form of a Greek cross, and are arranged in rows, and the openings of each row are staggered with respect to those of adjacent rows and they are made tapering, although in the preferred embodiment of the invention their walls are substantially vertical for a short distance at the top and are divergent from the lower ends of said vertical portions to the bottom of the sections and their medial lines are arranged in parallel relation instead of radial to admit of the straight downward passage of the ash, notwithstanding the grate-sections are curved transversely.

Figure 1 is a plan view of a grate-section embodying this invention. Fig. 2 is an edge view of the same. Fig. 3 is a transverse vertical section taken on the dotted line 3—3, Fig. 1. Fig. 4 is an end view.

The grate-section 1 is here shown as curved transversely on the arc of a circle from edge to edge and of rectangular outline, in plan. Said section has numerous openings 2, arranged in rows, and said rows are arranged in parallel relation with the edges and ends of the section and the openings of each row are staggered with relation to the openings of adjacent rows, as represented in Fig. 1. Each opening 2 is of the shape of a Greek cross, thus comprising four elongated, radially arranged portions which are merged together and while in the aggregate they are of considerable area, yet they will prevent the free passage through them of #3 or coarser hard coal. Openings of this form, when staggered, may be closely associated so that their combined areas over the surface of the grate-section is quite large as compared with the total area of the section, thereby providing for maximum air admission and distribution. Said openings extend wholly through the section and the walls of said openings are made substantially vertical for a short distance at the top, as at 3, from which points they diverge to the bottom of the section. By providing a short vertical portion at the top the corners may be burned off without increasing the area of the openings at the top, and it will be noticed that such area will not be increased until the grate has been burned away considerable. Furthermore, by making the openings tapering the air is caused to pass through them to the fuel-bed at a slightly increased velocity, admitting of it "fish-tailing" into the fuel-bed. The medial lines of said openings are arranged in parallel relation, (see Fig. 3) instead of radial, so that straight downward passages are provided for the ash which falls from the grate. The grate-section has at each end depending lugs 4, with slots to receive a bar-carrier 8, and said bar-carrier is fulcrumed at 9, and has a depending lug to which means to oscillate the same may be connected. The radius of the arc of the transverse curvature of the section is greater than the distance between the top of the section and the fulcrum 9 of the bar-carrier, so that as the grate-section is oscillated it will impart a slight lifting motion to the bottom of the fuel-bed.

I claim:—

1. A grate-section transversely curved from edge to edge throughout its length and having means for connecting it to a bar-carrier and having openings through it from top to bottom of the shape of a Greek cross, said openings being arranged in parallel rows and the openings of each row being staggered with respect to the openings of adjacent rows, and said openings being made tapering, substantially as described.

2. A grate-section transversely curved from edge to edge throughout its length and having means for connecting it to a bar-carrier and having openings through it from top to bottom of the shape of a Greek cross, said openings being arranged in parallel rows and the openings of each row being staggered with respect to the openings of adjacent rows, and said openings being made tapering and arranged with their medial lines in parallel relation, substantially as described.

3. A grate-section transversely curved from edge to edge throughout its length and having means for connecting it to a bar-carrier and having openings through it from top to bottom of the shape of a Greek cross, said openings being arranged in parallel rows and the openings of each row being staggered with respect to the openings of adjacent rows, the walls of said openings being made substantially vertical for a short distance at the top and divergent from the lower ends of said vertical portions to the bottom of the section, substantially as described.

4. An oscillating grate-section transversely curved from edge to edge throughout its length and having means for connecting it to a bar-carrier and having openings through it from top to bottom of the shape of a Greek cross, said openings being arranged in parallel rows and the openings of each row being staggered with respect to the openings of adjacent rows, and said openings being made tapering, a pivoted bar-carrier supporting said grate-section, the radius of the arc of the grate-section being greater than the distance between the top of the section and the fulcrum of the bar-carrier, substantially as described.

In testimony whereof, I have signed my name to this specification, in the presence of two subscribing witnesses.

CLAUDE B. ROBERTS.

Witnesses:
W. N. CARGILL,
H. C. DROWN.

Copies of this patent may be obtained for five cents each, by addressing the "Commissioner of Patents, Washington, D. C."